US012671862B2

(12) United States Patent
Chrystall et al.

(10) Patent No.: US 12,671,862 B2
(45) Date of Patent: Jun. 30, 2026

(54) AUDIO SIGNAL PROCESSING SYSTEM AND METHOD FOR PROVIDING NOISE CANCELLATION USING USER-DEFINED MARKERS

(71) Applicants:Douglas Chrystall, Wellesley, MA (US); Austin Miles, Wellesley, MA (US)

(72) Inventors: Douglas Chrystall, Wellesley, MA (US); Austin Miles, Wellesley, MA (US)

(*) Notice: Subject to any disclaimer, the term of this patent is extended or adjusted under 35 U.S.C. 154(b) by 297 days.

(21) Appl. No.: 18/223,585

(22) Filed: Jul. 19, 2023

(65) Prior Publication Data

US 2025/0030914 A1 Jan. 23, 2025

(51) Int. Cl.
*H04N 21/439* (2011.01)
*H04N 21/845* (2011.01)

(52) U.S. Cl.
CPC ..... *H04N 21/4396* (2013.01); *H04N 21/4394* (2013.01); *H04N 21/845* (2013.01)

(58) Field of Classification Search
CPC ........... H04N 21/4396; H04N 21/4394; H04N 21/845
See application file for complete search history.

(56) References Cited

U.S. PATENT DOCUMENTS

| | | | | |
|---|---|---|---|---|
| 11,770,595 B2 * | 9/2023 | Takahashi | .............. | H04H 60/23 |
| | | | | 709/217 |
| 2020/0252651 A1 * | 8/2020 | Cohn | ..................... | H04N 19/46 |
| 2024/0212706 A1 * | 6/2024 | Feng | ..................... | G11B 27/34 |
| 2024/0314270 A1 * | 9/2024 | Zhao | ........................ | H04N 7/15 |
| 2024/0428771 A1 * | 12/2024 | Butts | ................ | G10K 11/17823 |
| 2025/0097518 A1 * | 3/2025 | Hong | ................. | H04N 21/4583 |

* cited by examiner

*Primary Examiner* — Carolyn R Edwards

(57) ABSTRACT

The present invention discloses an audio processing system and method for providing noise cancellation using user defined markers. The system comprises an input module configured to receive an audio signal. The system further comprises a memory module in communication with the input module and a user interface. The user interface is configured to enable a user to select at least one segment of the audio signal. The memory module is configured to store the audio signal and the selected segment of the audio signal. The system further comprises a processing module in communication with the memory module. The processor module is configured to process the audio signal to remove the noise present in the selected audio segment, while leaving segments of the audio signal outside the selected segments unaffected, thereby providing a selective noise-cancellation of audio signal and produces an improved output audio signal.

13 Claims, 3 Drawing Sheets

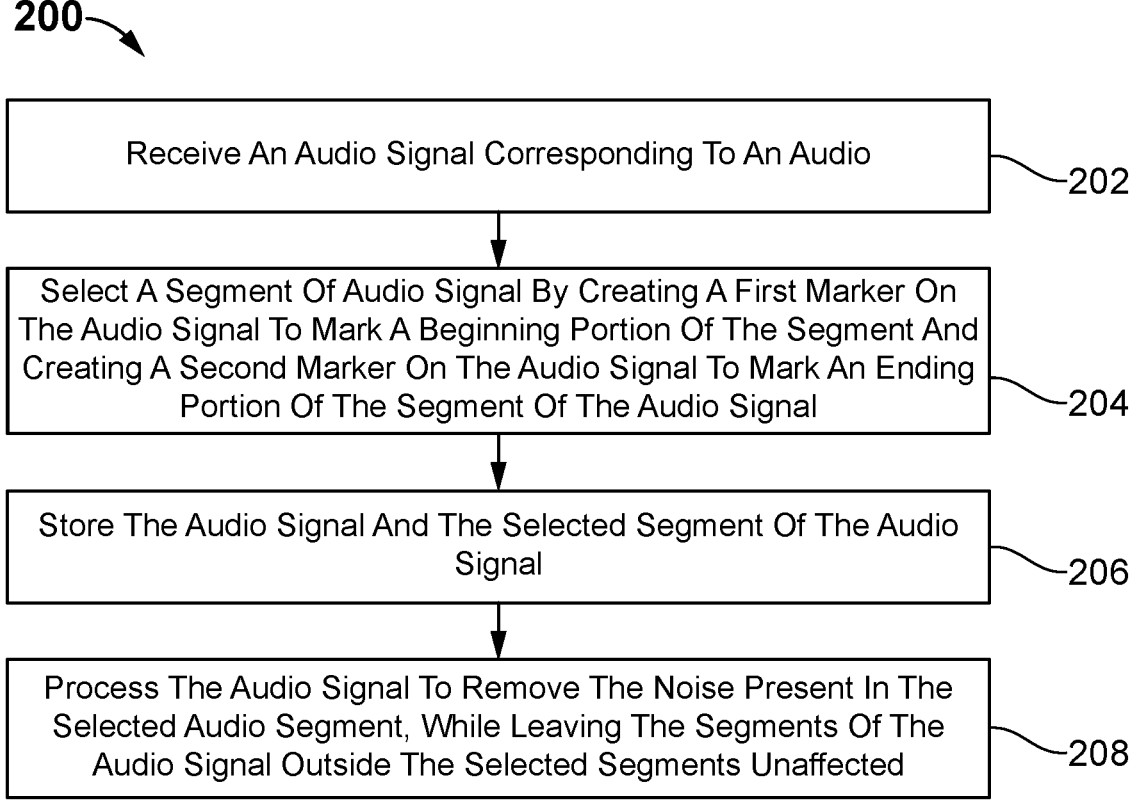

200

| Receive An Audio Signal Corresponding To An Audio | ~202 |

| Select A Segment Of Audio Signal By Creating A First Marker On The Audio Signal To Mark A Beginning Portion Of The Segment And Creating A Second Marker On The Audio Signal To Mark An Ending Portion Of The Segment Of The Audio Signal | ~204 |

| Store The Audio Signal And The Selected Segment Of The Audio Signal | ~206 |

| Process The Audio Signal To Remove The Noise Present In The Selected Audio Segment, While Leaving The Segments Of The Audio Signal Outside The Selected Segments Unaffected | ~208 |

FIG. 2

AUDIO SIGNAL PROCESSING SYSTEM AND METHOD FOR PROVIDING NOISE CANCELLATION USING USER-DEFINED MARKERS

TECHNICAL FIELD

The present invention generally relates to audio signal processing. More specifically, the present invention relates to an audio signal processing system and method for providing noise cancellation using user-defined markers.

BACKGROUND

Audio signal processing often deals the problem of processing audio signals corrupted by unwanted signals. The unwanted signals are classified as noise. Generally, the noise is introduced acoustically at the time of the recording, or introduced by subsequent signal corruption. A number of noise cancellation algorithms are developed to remove unwanted sounds from the audio signal. Most noise cancellation algorithms are subtractive, which identify certain frequencies that have higher levels of background noise and subtract those bands from the original audio signal.

For example, when a signal of interest and the noise are in separate frequency bands, the signal interest is identified and separated from the noise. A classical digital filter such as low-pass filter, high-pass filter or band-pass filter could be used to extract the desired signal. The filter allows to pass the frequency band of the signal of interest and rejects the frequency band occupied by the noise. These algorithms work best with deterministic signals, where there is little uncertainty regarding the type of noise that is being filtered and the type of noise that is being isolated. However, these filters are extremely ineffective in situations where the properties of the noise overlap with the properties of the clean signal to be isolated.

Therefore, there is still a need for an audio processing system that is flexible and can adapt to different types of noise environments at specific points in the recording.

SUMMARY

The present invention discloses an audio processing system for providing noise cancellation using user defined markers. The system comprises an input module configured to receive an audio signal corresponding to an audio. The system further comprises a memory module in communication with the input module. The memory module is configured to store the audio signal. The system further comprises a user interface in communication with the memory module. The user interface is configured to enable a user to select at least one segment of the audio signal. The memory module is further configured to store the selected segment of the audio signal. The system further comprises a processing module in communication with the memory module. The processor module is configured to process the audio signal to remove noise present in the selected audio segment, while leaving segments of the audio signal outside the selected segments unaffected, thereby providing a selective noise-cancellation of audio signal and producing an improved output audio signal.

In one embodiment, the user interface comprises a display configured to display the audio signal to select the segment by the user. The user interface is configured to enable the user to create a first marker on the audio signal to mark a beginning portion of the segment and create a second marker on the audio signal to mark an ending portion of the segment of the audio signal.

The user interface further comprises at least one button to enable the user to create the markers on the audio signal. The user interface is configured to enable the user to hold the button at the beginning portion of the segment to create the first marker and release the button at the ending portion of the segment to create the second marker. The user interface is further configured to enable the user to adjust a location of the first and second markers.

The system further comprises an output module configured to output the produced output audio signal. The system further comprises a noise cancellation module in communication with the processing module. The noise cancellation module comprises at least one noise cancellation algorithm.

The system further comprises a machine learning module in communication with the processing module and memory module. The machine learning module is configured to automatically identify one or more segments of the audio signal corrupted with noise and remove noise from the segments of the audio signal. In one embodiment, the machine learning module is trained to automatically identify noise in the audio signal based on the segments of the audio signal selected by the user. In one embodiment, the input module is further configured to receive a video signal along with the audio signal. The output module is configured to output the produced output audio signal and video signal.

The system further comprises a remote processing module in communication with the memory module via a network. The remote processing module is configured to receive an input to process the audio signal in a form of data package. In one embodiment, the data package comprises the audio signal, processing directives to process the audio signal, and metadata of the first and second markers. In another embodiment, the data package comprises the video signal, the audio signal, processing directives to process the audio signal, and metadata of the first and second markers. The system further receives a processing code including information related to a location of the markers and a type of processing required at different locations of the audio signal. In one embodiment, the processing code is stored in the audio signal using steganography.

The present invention further discloses an audio processing method for providing noise cancellation using user defined markers. At one step, a system comprising an input module, a memory module in communication with the input module, a user interface in communication with the memory module, a processing module in communication with the memory module, a noise cancellation module in communication with the processing module comprising at least one noise cancellation algorithm, and an output module in communication with the processing module, is provided. At another step, the input module is configured to receive an audio signal corresponding to an audio. At yet another step, the user interface is configured to enable a user to select at least one segment of the audio signal. The user interface is configured to display the audio signal to the user via a display. The user interface enables the user to create a first marker on the audio signal to mark a beginning portion of the segment and create a second marker on the audio signal to mark an ending portion of the segment of the audio signal. The user interface comprises a button to enable the user to create markers. The user interface further enables the user to adjust a location of the first and second markers.

At yet another step, the memory module is configured to store the audio signal and the selected segment of the audio signal. At yet another step, the processing module is configured to process the audio signal to remove noise present in the selected audio segment, while leaving segments of the audio signal outside the selected segments unaffected, thereby providing a selective noise-cancellation of audio signal and producing an improved output audio signal.

At yet another step, a remote processing module is configured to receive an input to process the audio signal in a form of data package. The remote processing module is in communication with the memory module via a network. The data package comprises the audio signal, processing directives to process the audio signal, and metadata of the first and second markers. The data package further comprises the video signal.

At yet another step, at least one of the processing module and the remote processing module is configured to receive a processing code including information related to a location of the markers and a type of processing required at different locations of the audio signal. In one embodiment, the processing code is stored in the audio signal using steganography. At yet another step, the output module is configured to output the produced output audio signal. In another embodiment, the input module is further configured to receive the video signal along with the audio signal and the output module is configured to output the produced output audio signal and video signal.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 exemplarily illustrates a flowchart of an audio processing method for providing noise cancellation using user defined markers, according to an embodiment of the present invention.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
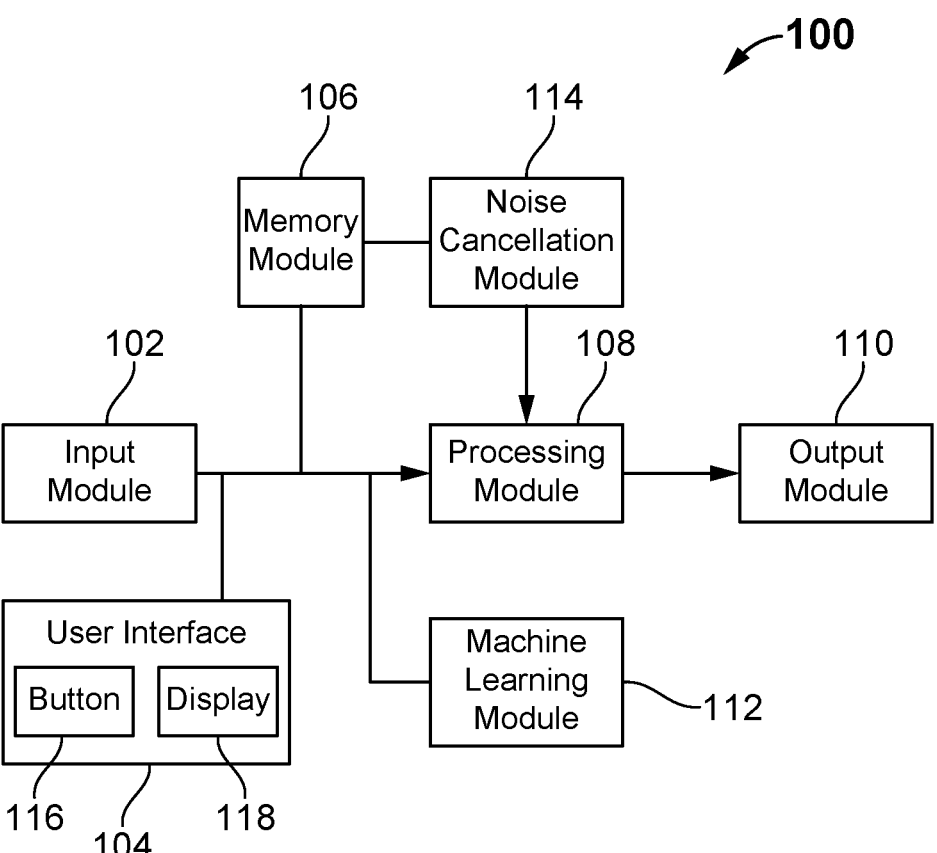
FIG. 1 exemplarily illustrates a block diagram of an audio processing system for providing noise cancellation using user defined markers, according to an embodiment of the present invention.

FIG. 1 exemplarily illustrates a block diagram 100 of an audio processing system for providing noise cancellation using user defined markers, according to an embodiment of the present invention. The audio processing system comprises an input module 102, a user interface 104, a memory module 106 and a processing module 108. In one embodiment, the input module 102 is configured to receive an audio signal corresponding to an audio. In another embodiment, the input module 102 is configured to receive an audio signal and video signal. In yet another embodiment, the input module 102 is configured to receive video signal. The memory module 106 in communication with the input module 102 configured to store the audio signal. The memory module 106 is further configured to store the video signal.

Further, the user interface 104 is in communication with the memory module 106. The user interface 104 is configured to enable a user to select at least one segment of the audio signal. The user interface 104 is configured to enable the user to create a first marker on the audio signal to mark a beginning portion of the segment and create a second marker on the audio signal to mark an ending portion of the segment of the audio signal. The first marker and the second marker define a desired segment selected by the user. The first marker and the second marker are also generally referred as markers. In another embodiment, the user interface 104 is configured to enable the user to select at least one segment of the input comprising the audio signal and the video signal.

In one embodiment, the user interface 104 comprises at least one button 116 and at least one display 118. The display 118 is configured to display the audio signal to the user. The button 116 is configured to enable the user to create and place the markers on the displayed audio signal to select at least one segment of the audio signal. In one embodiment, the user interface 104 is configured to enable the user to hold the button 116 at the beginning portion of the segment to create the first marker and release the button 116 at the ending portion of the segment to create the second marker. The user interface 104 is configured to enable the user to adjust a location of the first and second markers. The user interface 104 further shows the location of the markers in the audio signal and the portion of the signal that is subjected to noise cancellation.

In another embodiment, the user interface 104 could receive input from the user as an audio input. In another embodiment, the user interface 104 could receive input from the user as an audio input and video input. In another embodiment, the method of receiving input from the user could be using the button 116 or using signals, for example, visual signal, and audio signal.

The memory module 106 is in communication with the input module 102 and the user interface 104. The memory module 106 is configured to store the audio signal and the selected segment of the audio signal. The system further comprises a processing module 108 in communication with the input module 102, the user interface 104 and the memory module 106.

The processing module 108 is configured to process the audio signal to remove noise present in the selected audio segment, while leaving segments of the audio signal outside the selected segments unaffected, thereby providing a selective noise-cancellation of audio signal and producing an improved output audio signal. The noise cancellation module 114 is being executed at the processing module 108 configured to remove noise present in the selected audio segment. The noise cancellation module 114 comprises a noise cancellation algorithm. In one embodiment, the noise cancellation module 114 is stored in the memory module 106. In another embodiment, the system is configured to receive and process the audio signal and video signal.

The system further comprises an output module 110 configured to output the produced audio signal. In one embodiment, the output module 110 could be a speaker or any other audio device. In another embodiment, the output module 110 is further configured to output the processed video signal. In yet another embodiment, the output module 110 is further configured to output the processed video signal along with audio signal.

The system further comprises a machine learning module 112 in communication with the processing module 108 and memory module 106. The machine learning module 112 is configured to automatically identify noise in the audio signal and remove noise from at least one segment of the audio signal. The machine learning module 112 is trained using a large set of data comprising the segments selected by a plurality of users of a plurality of audio signals. The machine learning module 112 is trained automatically identify noise in the audio signal.

The system further comprises a remote processing module in communication with the memory module 106 via a network. In one embodiment, the processing module 108 could be provided as the remote processing module. In one embodiment, the remote processing module is configured to receive input to process the audio signal in a form of data package. In another embodiment, the remote processing module is configured to electronically receive input to process the audio signal.

In one embodiment, the data package comprises the audio signal, processing directives, and metadata of the markers. In another embodiment, the data package comprises the video signal, the audio signal, processing directives, and metadata of the markers. The system is further configured to receive a processing code including information related to a location of the markers and a type of processing required at different locations of the audio signal. In one embodiment, the processing code is stored in the audio signal using steganography.

FIG. 2 exemplarily illustrates a flowchart of an audio processing method 200 for providing noise cancellation using user defined markers, according to an embodiment of the present invention. The method 200 is executed in the system comprising the input module 102, the memory module 106 in communication with the input module 102, a user interface 104 in communication with the memory module 106, the processing module 108 in communication with the memory module 106, a noise cancellation module 114 in communication with the processing module 108 comprising at least one noise cancellation algorithm, and the output module 110 in communication with the processing module 108. The user interface 104 comprises at least one display 118 and at least one button 116. At step 202, the input module 102 is configured to receive the audio signal corresponding to the audio.

At step 204, the user interface 104 is configured to enable the user to select at least one segment of the audio signal. The user interface 104 is configured to display the audio signal to the user via the display 118. The user interface 104 enables the user to create the first marker on the audio signal to mark the beginning portion of the segment and create second marker on the audio signal to mark the ending portion of the segment of the audio signal. The button 116 enables the user to create markers. The user could hold the button 116 at the beginning portion of the segment to create the first marker and release the button 116 at the ending portion of the segment to create the second marker. The user interface 104 further enables the user to adjust the location of the first and second markers.

At step 206, the memory module 106 is configured to store the audio signal and the selected segment of the audio signal.

At step 208, the processing module 108 is configured to process the audio signal to remove the noise present in the selected audio segment, while leaving segments of the audio signal outside the selected segments unaffected, thereby providing a selective noise-cancellation of audio signal and producing an improved output audio signal.

The system further comprises a remote processing module. In one embodiment, the processing module 108 could be the remote processing module. The remoter processing module is configured to receive the input to process the audio signal in a form of data package. The remote processing module is in communication with the memory module 106 via the network. In one embodiment, the data package comprises the audio signal, processing directives to process the audio signal, and metadata of the first and second markers. In another embodiment, the data package further comprises the video signal.

Further, at least one of the processing module 108 and the remote processing module is configured to receive a processing code including information related to the location of the markers and a type of processing required at different locations of the audio signal. In one embodiment, the processing code is stored in the audio signal using steganography. The output module 110 is configured to output the produced audio signal without noise.

In another embodiment, the input module 102 is configured to receive an audio signal and video signal. The user interface 104 is configured to enable the user to select at least one segment of the input comprising the audio signal and the video signal. The processing module 108 is configured to receive and process the audio signal and video signal. The output module 110 is further configured to output the produced audio signal and video signal without noise.

The system further comprises a machine learning module 112 in communication with the processing module 108 and memory module 106. The method 200 further enables the machine learning module 112 to automatically identify noise in the audio signal and remove noise from at least one segment of the audio signal. The machine learning module 112 is trained using a large set of data comprising the segments selected by a plurality of users of a plurality of audio signals. The machine learning module 112 is trained automatically identify noise in the audio signal.

Figure 3:
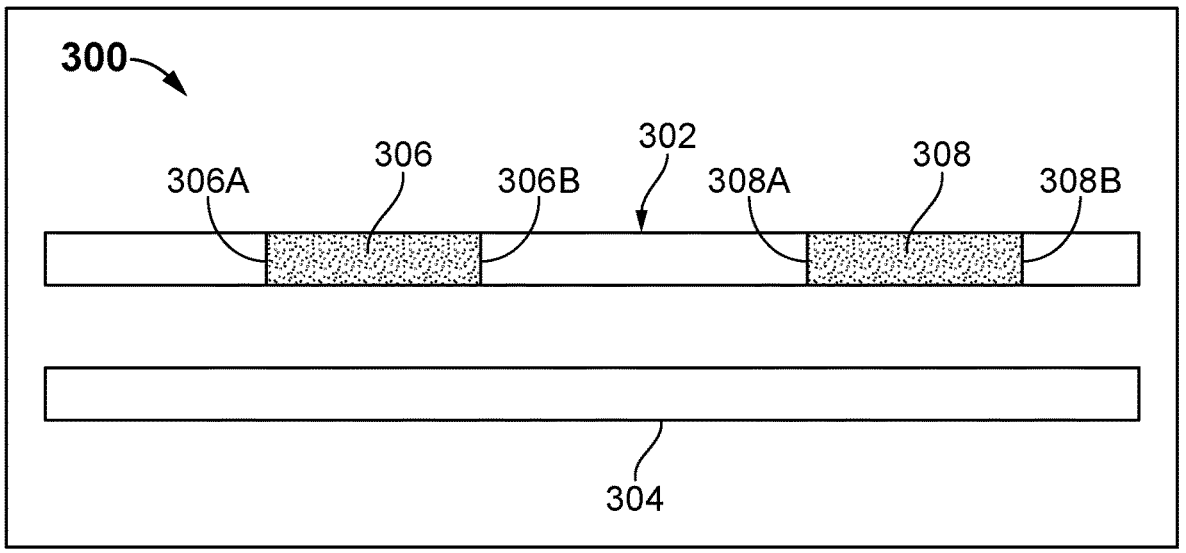
FIG. 3 is a schematic diagram illustrating the selection of segments of the audio signal, according to an embodiment of the present invention.

FIG. 3 is a schematic diagram 300 illustrating the selection of segments of the audio signal, according to an embodiment of the present invention. According to an embodiment of the present invention, the system is configured to receive the audio signal corresponding to an audio stream 302 and a video signal corresponding to a video stream 304. The system enables the user to select one or more segments (306, 308) of the audio signal. According to this embodiment, the system displays at least two segments (306, 308) selected by the user. The segments (306, 308) include a first segment 306 and a second segment 308. At least two markers (306A, 306B) define the first segment 306 and at least two markers (308A, 308B) define the second segment 308. Further, the system is configured to process the audio signal to remove the noise present in the selected audio segments (306, 308), while leaving segments of the audio signal outside the selected segments (306, 308) unaffected, thereby providing a selective noise-cancellation of the audio signal and producing an improved output audio signal.

Advantageously, the present invention enables the users to specify parts of the audio signal that need to be subjected to noise cancellation. The system employs user-defined markers to identify segments of the audio signal where noise cancellation is desired, while leaving other segments unaffected. The system enables the user to perform a simple action such as holding down the button 116 to create the marker at the beginning of a desired segment and releasing the button 116 to create another marker at the end of the segment. The audio between the markers is noise-canceled, while audio outside of the markers is left untouched. Further, by enabling the users to specify parts of the audio signal that need to be subjected to noise cancellation, the system could be customized to different types of noise environments and the needs of the user. This approach also allows for greater flexibility in terms of when and where noise cancellation is applied. Furthermore, the system could be implemented using existing hardware and software, making it a cost-effective solution for noise reduction. The system provides a flexible and adaptable approach to noise reduction. The invention is cost-effective, easy to use, and can be implemented using existing hardware and software.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An audio processing system for providing noise cancellation, comprising:
   an input module comprising a microphone or an audio and video capture device, wherein the input module is configured to receive an audio signal corresponding to an audio;
   a memory module comprising a non-volatile memory device, such as a flash storage or RAM, in communication with the input module, configured to store the audio signal;
   a user interface comprising a display and buttons or physical controls, in communication with the memory module configured to enable a user to select at least one segment of the audio signal, wherein the user interface is configured to enable the user to create a first marker on the audio signal to mark a beginning portion of the segment and create a second marker on the audio signal to mark an ending portion of the segment of the audio signal, and
   a processing module comprising a processor, such as a central processing unit (CPU) or a digital signal processor (DSP), in communication with the memory module configured to process the audio signal to remove noise present in the selected audio segment, while leaving segments of the audio signal outside the selected segments unaffected, thereby providing a selective noise-cancellation of audio signal and producing an improved output audio signal;
   a machine learning module comprising a neural network or a deep learning system, in communication with the processing module and the memory module, wherein the machine learning module is configured to automatically identify one or more segments of the audio signal corrupted with the noise and remove the noise from the segments of the audio signal, and
   a remote processing module in communication with the memory module via a network, the remote processing module is configured to receive an input to process the audio signal in a form of data package, wherein the data package comprises the audio signal, processing directives to process the audio signal, and metadata of the first and second markers.

2. The system of claim 1, wherein the user interface is configured to enable the user to hold the button at the beginning portion of the segment to create the first marker and release the button at the ending portion of the segment to create the second marker.

3. The system of claim 1, wherein the user interface is configured to enable the user to adjust a location of the first and second markers.

4. The system of claim 1, further comprises an output module comprising a speaker or an audio output device, configured to output the produced output audio signal.

5. The system of claim 1, further comprises a noise cancellation module in communication with the processing module, wherein the noise cancellation module comprises at least one noise cancellation algorithm.

6. The system of claim 1, wherein the machine learning module is configured to train to identify noise in the audio signal based on the segment of the audio signal selected by the user.

7. The system of claim 1, wherein the input module is further configured to receive a video signal along with the audio signal, and the output module is configured to output the processed audio signal and video signal.

8. The system of claim 1, wherein the data package comprises the video signal.

9. The system of claim 1, further receives a processing code including information related to a location of the markers and a type of processing required at different locations of the audio signal, wherein the processing code is stored in the audio signal using steganography.

10. An audio processing method for providing noise cancellation, comprising the steps of:

providing a system comprising an input module comprising a microphone or audio capture device, a memory module comprising a memory device such as a flash storage or RAM, in communication with the input module, a user interface comprising a touch screen or physical controls, in communication with the memory module, a processing module comprising a CPU or DSP, in communication with the memory module, a noise cancellation module comprising at least one noise cancellation algorithm, in communication with the processing module, and an output module comprising a speaker or audio output device, in communication with the processing module;

receiving, via the input module, an audio signal corresponding to an audio;

enabling, via the user interface, a user to select at least one segment of the audio signal, displaying the audio signal to the user via a display of the user interface; enabling, via at least one button of the user interface, the user to create a first marker on the audio signal to mark a beginning portion of the segment and create a second marker on the audio signal to mark an ending portion of the segment of the audio signal, and enabling the user to adjust a location of the first and second markers;

storing, at the memory module, the audio signal and the selected segment of the audio signal, and processing, at the processing module, the audio signal to remove noise present in the selected audio segment, while leaving segments of the audio signal outside the selected segments unaffected, thereby providing a selective noise-cancellation of audio signal and producing an improved output audio signal;

training a machine learning module comprising a neural network or a deep learning system, in communication with the processing module and memory module to identify noise in the audio signal based on the segment of the audio signal selected by the user;

automatically identifying, via the machine learning module, one or more segments of the audio signal corrupted with the noise and remove noise from the segments of the audio signal;

receiving, at a remote processing module, an input to process the audio signal in a form of data package, wherein the data package comprises the audio signal, processing directives to process the audio signal, and metadata of the first and second markers, wherein the remote processing module is in communication with the memory module via a network, and receiving, at the processing module and the remote processing module, a processing code including information related to a location of the markers and a type of processing required at different locations of the audio signal.

11. The method of claim 10, wherein the input module is further configured to receive a video signal along with the audio signal, and the output module is configured to output the processed audio signal and video signal.

12. The method of claim 10, wherein the data package further comprises the video signal and the processing code is stored in the audio signal using steganography.

13. The method of claim 10, further comprising the step of: outputting, at the output module, the produced output audio signal.

\* \* \* \* \*